(12) United States Patent
Tsukamoto et al.

(10) Patent No.: US 11,576,358 B2
(45) Date of Patent: Feb. 14, 2023

(54) SPIGOT JOINT FISHING ROD (71) Applicant: GLOBERIDE, Inc., Tokyo (JP)

(72) Inventors: Yasuhiro Tsukamoto, Tokyo (JP); Kenichi Kameda, Tokyo (JP); Atsushi Saito, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 16/981,580

(22) PCT Filed: Mar. 29, 2019

(86) PCT No.: PCT/JP2019/014369
§ 371 (c)(1),
(2) Date: Sep. 16, 2020

(87) PCT Pub. No.: WO2019/189907
PCT Pub. Date: Oct. 3, 2019

(65) Prior Publication Data
US 2021/0051934 A1 Feb. 25, 2021

(30) Foreign Application Priority Data
Mar. 30, 2018 (JP) .............................. JP2018-067201

(51) Int. Cl.
*A01K 87/02* (2006.01)
*A01K 87/00* (2006.01)
*F16B 7/02* (2006.01)

(52) U.S. Cl.
CPC .............. *A01K 87/02* (2013.01); *A01K 87/00* (2013.01); *F16B 7/02* (2013.01)

(58) Field of Classification Search
CPC ........ A01K 87/02; A01K 87/00; A01K 87/06; A01K 87/08; A01K 87/04; F16B 7/02; B63B 35/14

(Continued)

(56) References Cited

U.S. PATENT DOCUMENTS 2,544,712 A * 3/1951 Miller .................... F16L 19/04
403/369
2,601,351 A * 6/1952 Wilburn ................ F16B 7/0426
43/18.1 R
3,263,323 A * 8/1966 Maher .................. B23K 20/085
285/288.1

(Continued)

FOREIGN PATENT DOCUMENTS

JP 5-68270 U 9/1993
JP 3072812 U 11/2000

(Continued)

OTHER PUBLICATIONS

First Office Action dated Sep. 3, 2021, issued in corresponding Chinese Patent Application No. 201980020890.3 with English translation.

(Continued)

*Primary Examiner* — Darren W Ark
*Assistant Examiner* — Katelyn T Truong
(74) *Attorney, Agent, or Firm* — K&L Gates LLP (57) ABSTRACT

A fishing rod according to one embodiment of the invention includes a small-diameter hollow rod body extending in a central axis direction, a large-diameter hollow rod body extending in the central axis direction, and a spigot ferrule inserted in the small-diameter rod body from its rear end and into the large-diameter rod body from its front end to connect the small-diameter rod body and the large-diameter rod body. In the fishing rod, a first inclined surface that extends from an rear end of the small-diameter rod body at an angle of 0.1° to 10.0° with respect to the central axis direction is formed on an inner peripheral surface of the small-diameter rod body.

14 Claims, 5 Drawing Sheets

(58) Field of Classification Search
USPC ........ 43/18.1 HR, 8.1 CT, 27.4, 27.2, 43.13,
43/43.12, 24; 285/298, 302, 18, 31, 65,
285/66, 223, 224; 138/120
See application file for complete search history.

(56) References Cited

U.S. PATENT DOCUMENTS

| | | | | |
|---|---|---|---|---|
| 3,451,119 | A * | 6/1969 | Brown | B23P 11/022 |
| | | | | 29/446 |
| 3,819,103 | A * | 6/1974 | Howell | B23K 20/085 |
| | | | | 228/2.5 |
| 3,947,141 | A * | 3/1976 | Casset | A01K 87/02 |
| | | | | 403/109.8 |
| 3,987,952 | A * | 10/1976 | Wittman | B23B 31/40 |
| | | | | 228/2.5 |
| 4,068,346 | A * | 1/1978 | Binder | B25G 1/04 |
| | | | | 15/159.1 |
| 4,272,005 | A * | 6/1981 | Jackson | B23K 20/08 |
| | | | | 228/175 |
| 4,769,892 | A * | 9/1988 | Kneller | F16L 13/00 |
| | | | | 29/521 |
| 6,902,205 | B2 * | 6/2005 | Bouey | F16L 33/224 |
| | | | | 285/243 |
| 10,316,998 | B2 * | 6/2019 | Williams | F16L 19/043 |
| 10,344,898 | B2 * | 7/2019 | Bennett | F16L 25/00 |
| 2012/0180374 | A1 * | 7/2012 | Saunders | A01K 87/08 |
| | | | | 43/23 |

FOREIGN PATENT DOCUMENTS

| | | |
|---|---|---|
| JP | 2001-095432 A | 4/2001 |
| JP | 2001-352865 A | 12/2001 |
| JP | 2002-125527 A | 5/2002 |
| JP | 2003-250396 A | 9/2003 |
| JP | 2011-087502 A | 5/2011 |

OTHER PUBLICATIONS

International Search Report dated Jun. 25, 2019 issued in corresponding International Application No. PCT/JP2019/014369 with English translation (3 pgs.).
International Preliminary Report on Patentability dated Mar. 3, 2020 issued in corresponding International Patent Application No. PCT/JP2019/014369 w/English translation (11 pgs.).
Extended European Search Report dated Oct. 4, 2021 issued in corresponding European Patent Application No. 19775052.4 (8 pgs.).
Second Office Action dated Jan. 29, 2022 issued in corresponding Chinese Patent Application No. 201980020890.3, with English translation (7 pgs.).
Office Action and English translation for related Korean Patent Application No. 10-2020-7027143; action dated Jun. 30, 2022; (6 pages).

* cited by examiner

SPIGOT JOINT FISHING ROD

CROSS-REFERENCE TO RELATED APPLICATIONS

This application is the U.S. National Phase Application of PCT/JP2019/014369, filed Mar. 29, 2019, which claims the benefit of priority from Japanese Patent Application Serial No. 2018-067201, filed Mar. 30, 2018. The contents of each of these applications are incorporated herein by reference in their entireties.

TECHNICAL FIELD

The present invention relates to a spigot joint fishing rod in which a small-diameter rod body and a large-diameter rod body is jointed with a spigot ferrule.

BACKGROUND

The present invention relates to a spigot joint fishing rod in which a small-diameter rod body and a large-diameter rod body are jointed with a spigot ferrule. A conventional spigot joint fishing rod is disclosed in, for example, Japanese Patent Application Publication No. 2003-250396.

In the spigot joint fishing rod, the small-diameter rod body and the large-diameter rod body are both formed as hollow tubes and one end of the spigot ferrule is inserted in the small-diameter rod body and the other end of the spigot ferrule is inserted in the large-diameter rod body to joint the small-diameter rod body and the large-diameter rod body. One end of the spigot ferrule is inserted into a bottom end of the small-diameter rod body and the other end is inserted into a tip end of the large-diameter rod body.

RELEVANT REFERENCES

List of Relevant Patent Literature

Patent Literature 1: Japanese Patent Application Publication No. 2003-250396

SUMMARY

When the spigot joint fishing rod is flexed, the spigot ferrule is subjected to bending stress and shear stress. The bending stress tends to concentrate on points where the spigot ferrule contacts the end of the rod part. The concentration of bending stress may damage the spigot ferrule during use of the fishing rod.

One object of the invention is to prevent breakage of a spigot ferrule in a spigot joint fishing rod.

Specifically, one object of the invention is to prevent the concentration of bending stress on the spigot ferrule in the spigot joint fishing rod.

Other objects of the present invention will be apparent with reference to the entire description in this specification.

A fishing rod according to one embodiment of the invention includes a small-diameter hollow rod body extending in a central axis direction, a large-diameter hollow rod body extending in the central axis direction, and a spigot ferrule inserted in the small-diameter rod body from its rear end and into the large-diameter rod body from its front end to connect the small-diameter rod body and the large-diameter rod body. In the fishing rod, a first inclined surface that extends from an rear end of the small-diameter rod body at an angle of 0.1° to 10.0° with respect to the central axis direction is formed on an inner peripheral surface of the small-diameter rod body.

According to the aspect, the first inclined surface is inclined at an angle of 0.1° to 10.0° with respect to the central axis direction so that the breaking load of the spigot ferrule against the shear stress applied by the large-diameter rod body becomes large as compared with the case where the inclined surface is not formed or inclined at an angle more than 10.0° with respect to the central axis direction.

In the fishing rod, a first inclined surface that extends from the rear end of the small-diameter rod body at an angle of 0.1° to 5.0° with respect to the central axis direction is formed on an inner peripheral surface of the small-diameter rod body.

In the fishing rod, the first inclined surface may be formed such that it inclines at an angle of 1.0° to 3.0° with respect to the central axis direction. In the fishing rod, the first inclined surface may be formed such that it inclines at an angle of 1.0° to 2.0° with respect to the central axis direction.

In the fishing rod, the first inclined surface extends from the rear end of the small-diameter rod body to a first position in the central axis direction, and the spigot ferrule is inserted further than the first position in the central axis direction.

In the fishing rod, a length L1 from the rear end to the first position in the central axis direction satisfies L1≤10T1, where T1 is a thickness of the small-diameter rod body.

In the fishing rod, a second inclined surface that extends from the front end of the small-diameter rod body at an angle of 0.1° to 10.0° with respect to the central axis direction is formed on an inner peripheral surface of the large-diameter rod body. In the fishing rod, the second inclined surface may be formed such that it inclines at an angle of 1.0° to 3.0° with respect to the central axis direction.

In the fishing rod, the second inclined surface may be formed such that it inclines at an angle of 1.0° to 2.0° with respect to the central axis direction.

In the fishing rod, the second inclined surface extends from the front end of the large-diameter rod body to a second position in the central axis direction, and the spigot ferrule is inserted further than the second position in the central axis direction.

In the fishing rod, a length L2 from the front end to the second position in the central axis direction satisfies L2≤10T2, where T2 is a thickness of the large-diameter rod body.

According to the aspect of the invention, it is possible to prevent the concentration of bending stress on the spigot ferrule in the spigot joint fishing rod.

DESCRIPTION OF THE EMBODIMENTS

Various embodiments of the present invention will be hereinafter described with reference to the accompanying drawings. In the drawings, like constituent elements are denoted by like reference numerals throughout. It should be noted that components in the drawings are not necessarily drawn to scale for the sake of convenience of description.

Figure 1:
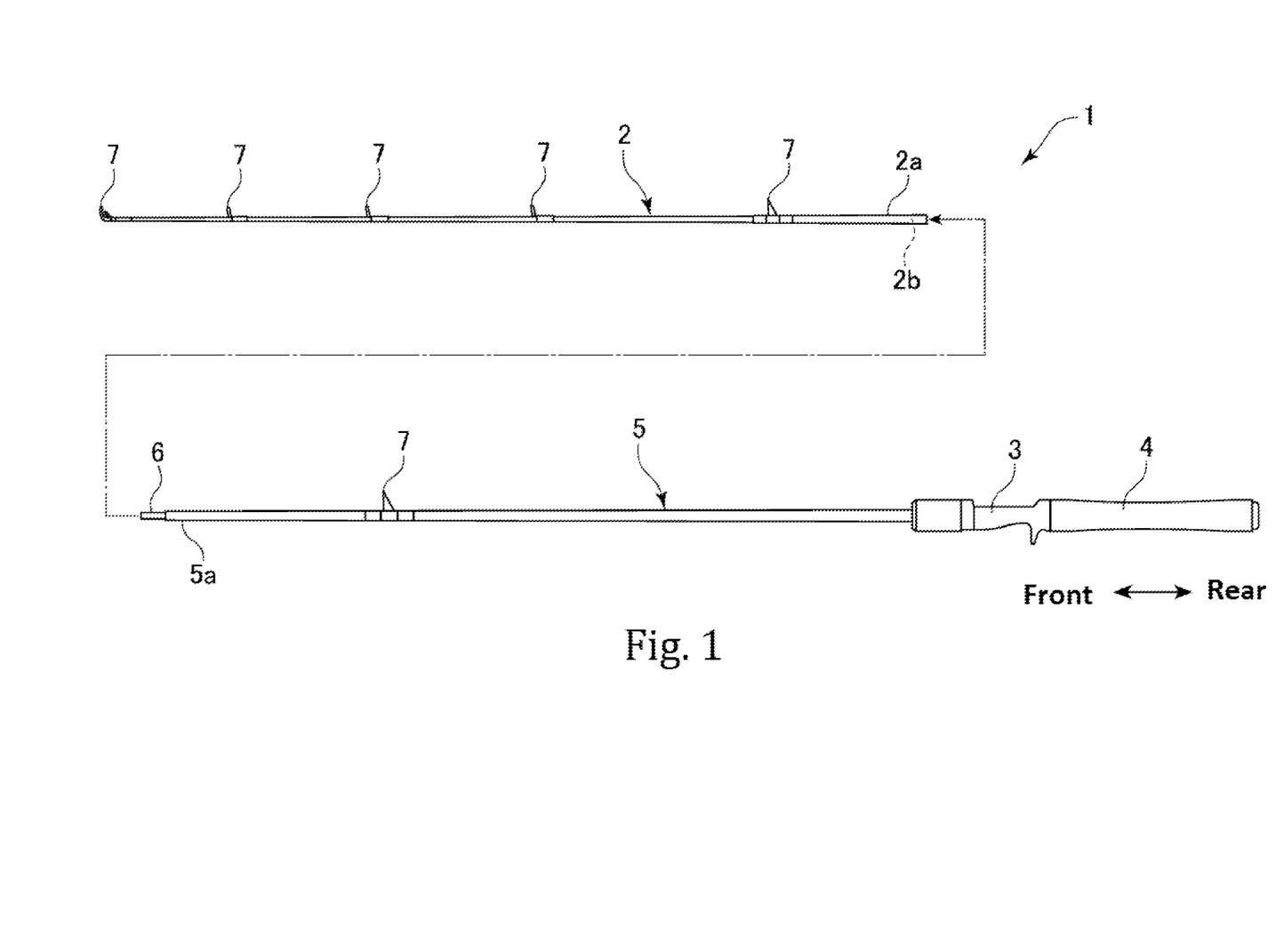
FIG. 1 schematically illustrates a spigot joint fishing rod according to an embodiment of the invention.
Figure 2:
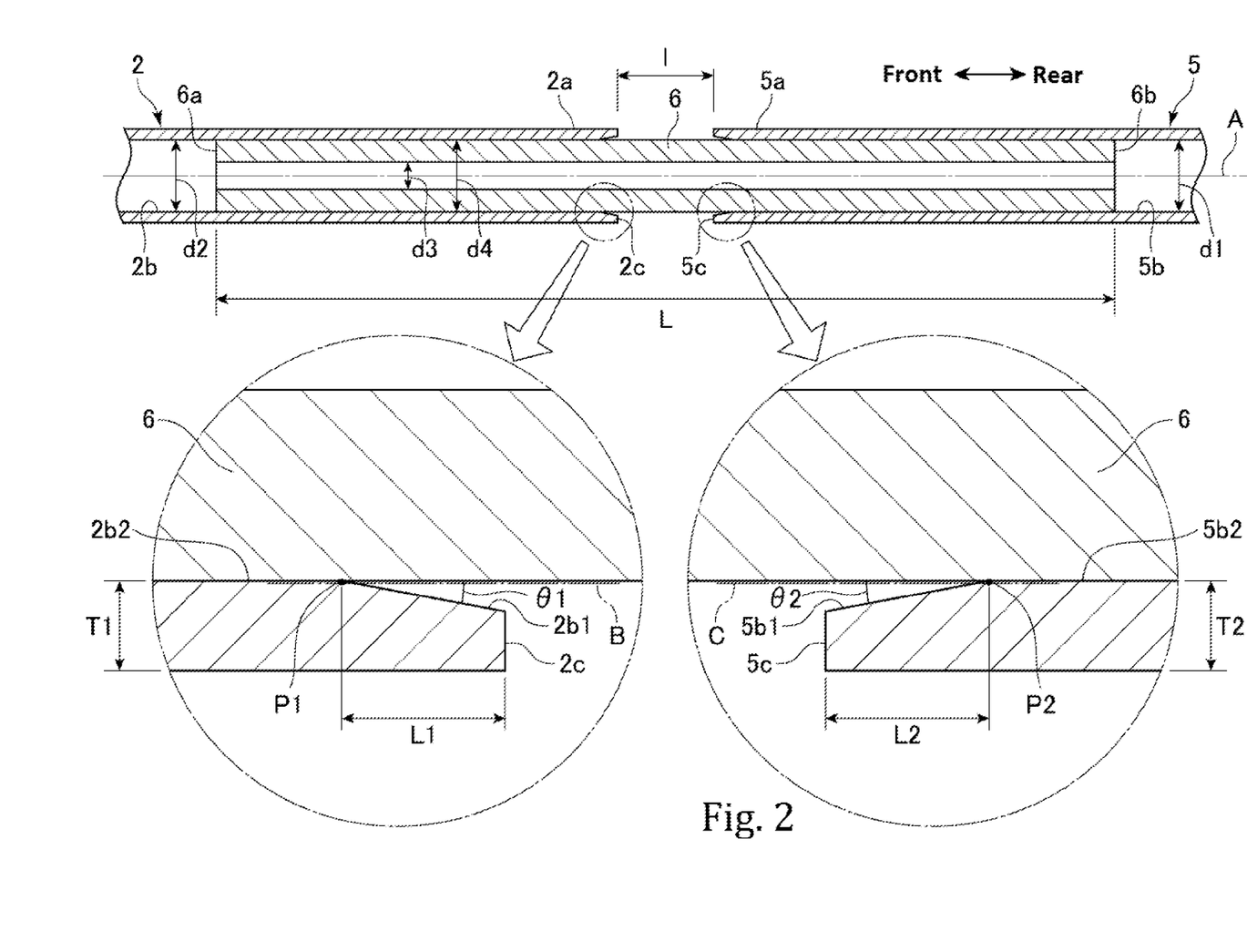
FIG. 2 is a sectional view of a joint structure between a large-diameter rod body and a small-diameter rod body of the fishing rod of FIG. 1.

FIG. 1 schematically illustrates a spigot joint fishing rod 1 according to an embodiment of the invention. FIG. 2 is a sectional view of a joint structure between a large-diameter rod body and a small-diameter rod body of the fishing rod 1. FIG. 2 shows a cross section of the fishing rod 1 cut along a plane passing through a central axis A of a butt rod 5 (which coincides with the central axis A of a tip rod 2).

As shown in FIG. 1, the fishing rod 1 includes the tip rod 2 and the butt rod 5 jointed to the tip rod 2. The tip rod 2 and the butt rod 5 are formed in a hollow tubular shape extending along the central axis A. The tip rod 2 and the hand rod 5 are obtained, for example, by firing a prepreg sheet made of carbon fibers impregnated with a synthetic resin to form a tubular fired body, and polishing or coating the tubular fired body.

A grip 4 is provided on a rear end of the butt rod 5 of the fishing rod. In front of the grip 4, a reel seat 3 is provided on the butt rod 5. Two or more fishing line guides 7 are attached on the outer surface of the tip rod 2 and the butt rod 5 of the fishing rod. An unshown reel is attached to the real seat 3. The front and rear directions of the fishing rod 1, or the tip rod 2 and the butt rod 5 of the fishing rod 1 are herein referred to the front and rear directions indicated in FIG. 1.

In one embodiment, an inner diameter d1 of the butt rod 5 is larger than an inner diameter d2 of the tip rod 2. The tip rod 2 is an example of a small-diameter rod body, and the butt rod 5 is an example of a large-diameter rod body. The inner diameter d1 of the butt rod 5 and the inner diameter d2 of the tip rod 2 are, for example, in the range of 3 to 15 mm, and the outer diameters thereof are formed in the range of 5 to 20 mm. The dimensions of the tip rod 2 and the butt rod 5 described herein are merely examples.

The tip rod 2 and the butt rod 5 are detachably connected to each other via a spigot ferrule 6. The spigot ferrule 6 can be obtained, for example, by firing a prepreg sheet made of carbon fibers impregnated with a synthetic resin to form a tubular fired body, and polishing or coating the tubular fired body. In the illustrated embodiment, the spigot ferrule 6 is formed in a hollow tubular shape extending along the central axis A direction. The spigot ferrule 6 may have the same outer diameter over the entire length in the central axis A direction. The spigot ferrule 6 may be formed such that one end thereof has a larger diameter than the other end. For example, the spigot ferrule 6 may be formed such that the portion inserted into the butt rod 5 has a larger diameter than the portion inserted into the tip rod 2. The spigot ferrule 6 may be formed solid. The spigot ferrule 6 is formed to have a length L in the central axis direction of 50 to 150 mm, an inner diameter d3 of 2 to 10 mm, and an outer diameter d4 of 3 to 15 mm. The dimensions of the spigot ferrule 6 described herein are exemplary.

In one embodiment, the spigot ferrule 6 is inserted into the butt rod 5 to a predetermined position in the central axis A direction, and fixed to an inner peripheral surface 5b of the butt rod 5 by, for example, bonding. The spigot ferrule 6 is fixed to the butt rod 5 while a part thereof protrudes toward the front from a front end 5c of the butt rod 5. The butt rod 5 contacts the spigot ferrule 6 at a joint portion 5a. The joint portion Sa extends from the front end 5c of the butt rod 5 to a position facing a rear end 6b of the spigot ferrule 6.

The tip rod 2 is formed such that its inner diameter becomes smaller from the rear end toward the tip. Therefore, when the spigot ferrule 6 protruding from the front end 5c of the butt rod 5 is inserted into the tip rod 2 from a rear end 2c, the spigot ferrule 6 is inserted to a predetermined insertion limit position. In this way, the tip rod 2 and the butt rod 5 are coupled via the spigot ferrule 6.

In FIG. 2, the spigot ferrule 6 is inserted to the insertion limit position. When the spigot ferrule 6 is seated at the insertion limit position, there is a gap formed between the front end 5c of the butt rod 5 and the rear end 2c of the tip rod 2. The length l of the gap in the central axis A direction is, for example, 3 to 10 mm. This is an example of the gap size. Since there is the gap between the tip rod 2 and the butt rod 5, bending stress and shear stress act on the spigot ferrule 6 when the tip rod 2 and the butt rod 5 are flexed during use of the fishing rod 1.

In another embodiment, the spigot ferrule 6 is bonded to an inner peripheral surface 2b of a joint portion 2a of the tip rod 2. In this case, the spigot ferrule 6 is fixed to the tip rod 2 such that the spigot ferrule 6 projects rearward from the rear end 2c of the tip rod 2. By inserting the portion of the spigot ferrule 6 protruding from the rear end 2c of the tip rod 2 into the butt rod 5, the tip rod 2 and the butt rod 5 are connected via the spigot ferrule 6.

An inclined surface provided on the inner peripheral surface 2b of the tip rod 2 near the rear end 2c of the tip rod 2 will be now described. The inner peripheral surface 2b of the tip rod 2 includes a first inclined surface 2b1 extending from the rear end 2c with an inclination of a first angle $\theta 1$ with respect to the central axis A direction, and a cylindrical surface 2b2 extending from a front end position P1 of the first inclined surface 2b1 toward the tip of the tip rod 2 in parallel to or substantially parallel to the central axis A direction. The axis B extending parallel to the central axis A is shown in FIG. 2, and the first inclined surface 2b1 inclines at the first angle $\theta 1$ with the axis B as shown in FIG. 2. The first inclined surface 2b1 extends from the rear end 2c of the tip rod 2 to the position P1. The first inclined surface 2b1 is formed such that the inner diameter of the tip rod 2 gradually increases toward the rear end 2c of the tip rod 2. The cylindrical surface 2b2 is formed such that the inner diameter of the tip rod 2 is substantially constant in the central axis A direction, or the inner diameter of the tip rod 2 is gradually increased toward the rear end 2c. In one embodiment, the angle formed by the cylindrical surface 2b2 and the axis B is smaller than the angle $\theta 1$. A length L1 from the rear end 2c to the position P1 along the central axis A direction is, for example, in the range of 1 to 30 mm. The length L1 may be in the range of 1 to 5 mm. A thickness T1 of a portion of the tip rod 2 situated on the front side from the position P2 is 0.3 mm or more. The dimensions of the tip rod 2 described above are an example. In one embodiment, the length L1 from the rear end 2c to the position P1 along the central axis A direction may satisfy the relationship of L1≤10T1 with respect to the thickness T1. The first inclined surface 2b1 may be formed by performing centerless processing on a tubular fired body obtained by firing a prepreg sheet wound around a mandrel. The tip rod 2 may not have the first inclined surface 2b1.

The spigot ferrule 6 is inserted into the tip rod 2 until a front end 6a thereof is situated further than the position P1 (a position closer to the tip than the position P1) in the central axis A direction. In this way, the spigot ferrule 6 is attached to the tip rod 2 such that at least a part of the spigot ferrule 6 contacts the cylindrical surface 2b2.

In one embodiment, the first angle $\theta 1$ is in the range of 0.1° to 10.0°. In one embodiment, the first angle $\theta 1$ is in the range of 0.1° to 5.0°. In one embodiment, the first angle $\theta 1$ is in the range of 1.0° to 3.0°. In one embodiment, the first angle θ1 is in the range of 1.0° to 2.0°.

An inclined surface provided on the inner peripheral surface 5b of the butt rod 5 near the front end 5c of the butt rod 5 will be now described. The inner peripheral surface 5b of the butt rod 5 includes a second inclined surface 5b1 extending from the front end 5c with an inclination of a second angle θ2 with respect to the central axis A direction, and a cylindrical surface 5b2 extending from a rear end position P2 of the second inclined surface 5b1 toward the rear end of the butt rod 5 in parallel to or substantially parallel to the central axis A direction. The axis C extending parallel to the central axis A is shown in FIG. 2, and the second inclined surface 5b1 inclines at the second angle θ2 with the axis C as shown in FIG. 2. The second inclined surface 5b1 extends from the front end 5c of the butt rod 5 to the position P2. The second inclined surface 5b1 is formed such that the inner diameter of the butt rod 5 gradually increases toward the front end 5c of the butt rod 5. The cylindrical surface 5b2 is formed such that the inner diameter of the butt rod 5 is substantially constant along the central axis A direction, or the inner diameter of the butt rod 5 is gradually decreased toward the front end 5c. In one embodiment, the angle formed by the cylindrical surface 5b2 and the axis C is smaller than the angle θ2. A length L2 from the front end 5c to the position P2 along the central axis A direction is, for example, in the range of 1 to 30 mm. The length L1 may be in the range of 2 to 5 mm. A thickness T2 of a portion of the butt rod 5 situated on the rear side from the position P2 is 0.3 mm or more. The dimensions of the butt rod 5 described above are an example. In one embodiment, the length L2 from the front end 5c to the position P2 along the central axis A direction may satisfy the relationship of L2≤10T2 with respect to the thickness T2. The second inclined surface 5b1 may be formed by performing centerless processing on a tubular fired body obtained by firing a prepreg sheet wound around a mandrel.

The spigot ferrule 6 is inserted into the butt rod 5 until a rear end 6a thereof is situated further than the position P2 (a position closer to the butt end than the position P2) in the central axis A direction. In this way, the spigot ferrule 6 is attached to the butt rod 5 such that at least a part of the spigot ferrule 6 contacts the cylindrical surface 5b2.

In one embodiment, the second angle θ2 is in the range of 0.1° to 10.0°. In one embodiment, the second angle θ2 is in the range of 0.1° to 5.0°. In one embodiment, the second angle θ2 is in the range of 1.0° to 3.0°. In one embodiment, the second angle θ2 is in the range of 1.0° to 2.0°.

Example

Figure 3:
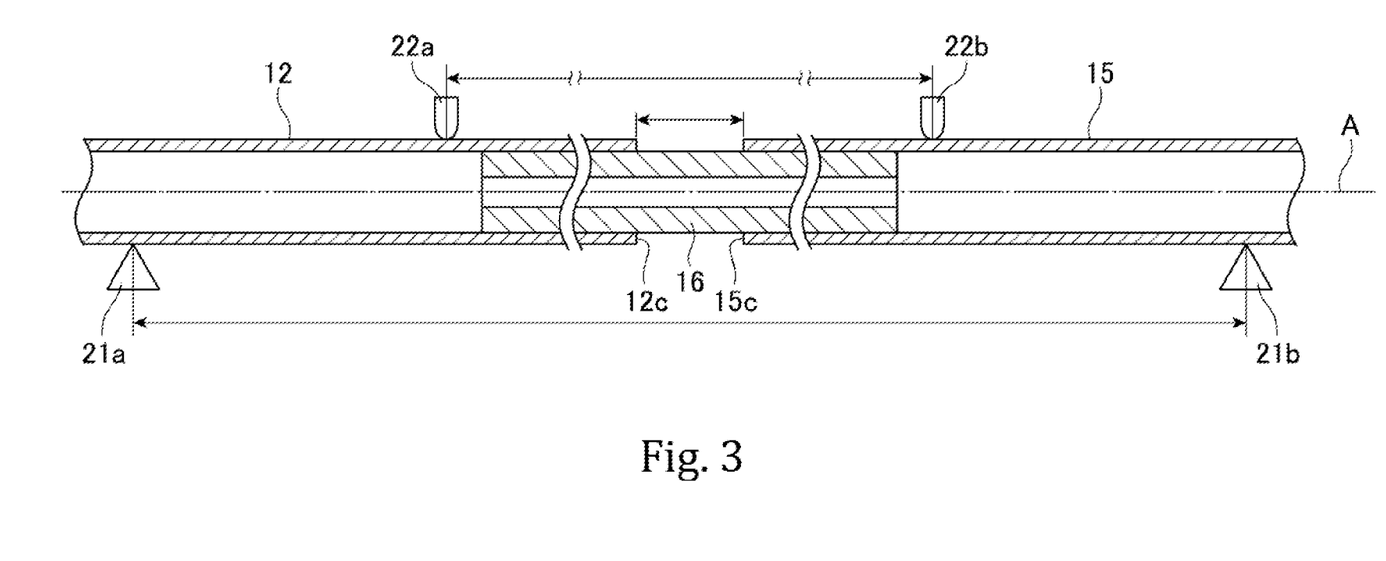
FIG. 3 schematically illustrates a test device and a specimen for a four-point bending test.

Bending fracture strength of specimens in which a first tubular body and a second tubular body were joined by a ferrule were measured by performing four-point bending tests in accordance with JIS K7074. FIG. 3 schematically illustrates a test device and a specimen used in the four-point bending test for measuring the bending fracture strength.

The specimen has a first tubular body 12, a second tubular body 15, and a ferrule 16 inserted into the first tubular body 12 and the second tubular body 15 to joint them.

The first tubular body 12 was fabricated as follows. A prepreg sheet in which carbon fibers were impregnated with a synthetic resin was first prepared. The prepreg sheet was wound around a mandrel, and the prepreg sheet wound around the mandrel was fired to obtain a sintered body. After fired, the mandrel was decoreed to obtain a tubular structure. The tubular structure had an inner diameter of 8.09 mm.

Next, an inner peripheral surface of a rear end 12c of the tubular structure is centerless ground to form an inclined surface extending from the rear end 12c at a predetermined angle with the central axis A direction. In this way, the first tubular body 12 has been obtained. Specifically, seven first tubular bodies 12 having the angle of the inclined surface of 0.1°, 1.0°, 1.2°, 10°, 15°, 20°, and 30° respectively were fabricated.

The second tubular body 15 was fabricated as follows. Similarly to the first tubular body 12, the prepreg sheet was first wound around a mandrel, and the prepreg sheet wound around the mandrel was fired to obtain a sintered body. After fired, the mandrel was decoreed to obtain a tubular structure. The tubular structure had an inner diameter of 8.20 mm. Seven second tubular bodies 15 were fabricated.

The ferrule 16 was fabricated as follows. Similarly to the first tubular body 12, the prepreg sheet was first wound around a mandrel, and the prepreg sheet wound around the mandrel was fired to obtain a sintered body. After fired, the mandrel was decoreed to obtain the ferrule 16. The ferrule 16 had an inner diameter of 3.0 mm, an outer diameter of 8.0 mm, and a length of 120 mm. Seven ferrule 16 were prepared.

Next, one end of the ferrule 16 was inserted from a front end 15c of the second tubular body 15 (the end where the inclined surface of the second tubular body 15 is formed). The ferrule 16 was inserted up to a position of about 50 mm from the front end 15c of the second tubular body 15. The ferrule 16 and the tubular body 15 were fixed by using an adhesive. The ferrule 16 protruding from the second tubular body 15 was then inserted into the first tubular body 12. The ferrule 16 was inserted to a position of about 65 mm from the rear end 12c of the first tubular body 12. In this way, a joint body in which the first tubular body 12 and the second tubular body 15 are joined by the ferrule 16 was obtained. As mentioned above, seven sets of the first tubular body 12, the second tubular body, and the ferrule 16 were prepared, and seven joint bodies were made using them. The joint bodies differ from each other in the inclined surface formed at the front end of the second tubular body 15. In the joined bodies, the distance between the rear end 12c of the first tubular body 12 and the front end 15c of the second tubular body 15 was 5.0 mm.

The four-point bending test based on JIS K7074 was performed on the seven joint bodies prepared as described above as the specimens. In the test device used for the test, the distance between a fulcrum 21a and a fulcrum 21b was 800 mm, and the distance between an indenter 22a and an indenter 22b was 240 mm. Using this test device, the bending fracture strength was measured for each of the above seven specimen under the condition of a speed of 50 mm/minutes.

Figure 4:
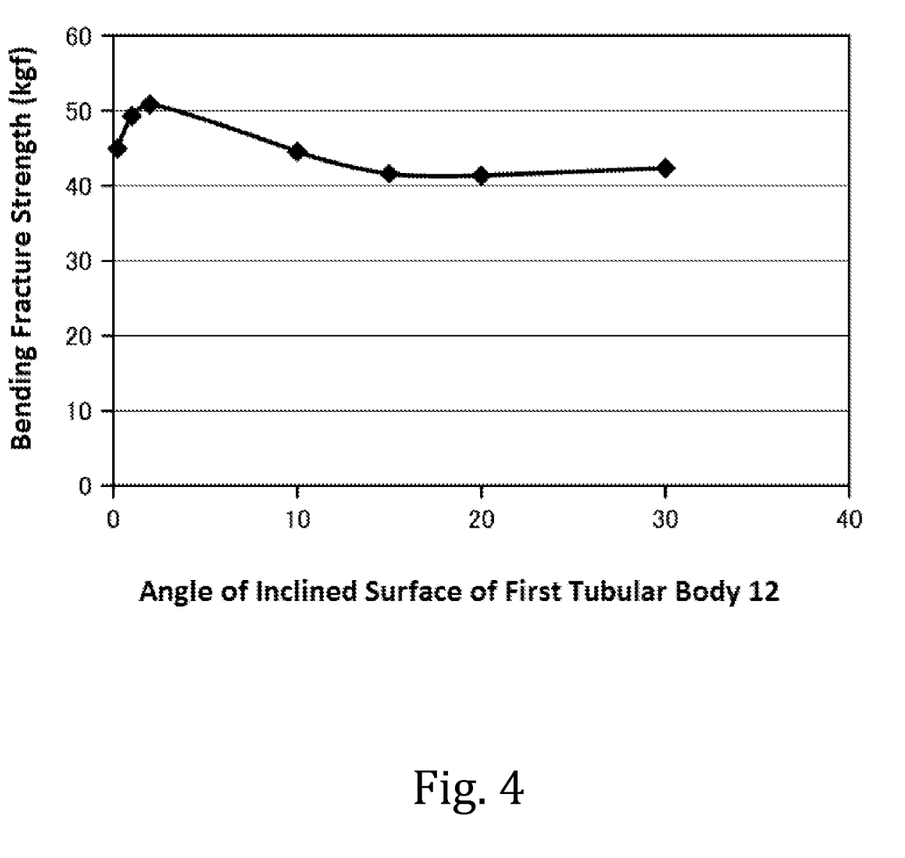
FIG. 4 is a graph showing measurement results of bending fracture strength of each specimen.

FIG. 4 shows the measurement result. FIG. 4 is a graph in which the bending fracture strength measured in the above four-point bending test is plotted for each of the seven specimens. The horizontal axis in FIG. 4 indicates the angle of the inclined surface of the first tubular body 12 of each specimen, and the vertical axis indicates the measured bending fracture strength.

It can be found from the graph of FIG. 4 that the bending fracture strength of the joint body changes depending on the above-described inclined surface (inclined surface extending from the rear end 12c of the first tubular body 12 at a predetermined angle with respect to the central axis A direction) formed in the inner peripheral surface of the first tubular body 12. In particular, it can be seen that the bending fracture strength of the joint body becomes the largest when the angle of the inclined surface was around 1.2°. Whereas when the angle of the inclined surface was between 1.2° and 15°, the bending fracture strength tends to decrease as the angle of the inclined surface increases. Furthermore, when the angle of the inclined surface exceeds 15°, the bending fracture strength was slightly increased, but the increase was very small.

In the above test, fracture of the specimen occurred at the ferrule 16. More specifically, the fracture of the ferrule 16 occurred in a portion around the position where the ferrule facing the rear end 12*c* of the first tubular body 12. When the bending stress acts on the test piece, such a fracture was considered to be caused mainly by the bending stress by the first tubular body 12 acting on the ferrule 16, particularly the bending stress which the ferrule 16 receives from the portion of the first tubular body 12 near the rear end 12*c*.

As discussed above, it has been found that a joint body with an improved bending fracture strength can be obtained by forming the inclined surface that extends from the front end of the inner peripheral surface of the first tubular body 12 at an angle of 0.1° to 10.0° with the central axis A direction. When the angle of the inclined surface is 1.0° to 5.0°, the joint body having a larger bending fracture strength can be obtained, and when the angle of the inclined surface is 1.0° to 3.0°, the joint body having a larger bending fracture strength can be obtained. When the angle of the inclined surface is 1.0° to 2.0°, the joint body having a more larger bending fracture strength can be obtained.

The reasons why the bending fracture strength is improved by providing the inclined surface that extends from the rear end 12*c* at a predetermined angle with the central axis A direction on the inner peripheral surface of the first tubular body 12 is considered as follows. First, the case where the inclined surface is not formed at the front end of the inner peripheral surface of the first tubular body 12 is considered for comparison. When the inclined surface is not formed in the vicinity of the rear end 12*c* of the inner peripheral surface of the first tubular body 12, bending stress from the first tubular body 12 acting on the ferrule 16 when a bending stress is applied to the joint body is concentrated on the portion of the ferrule 16 where faces the rear end 12*c* of the first tubular body 12. It is considered that, due to the concentration of the bending stress on the portion of the ferrule, fracture is likely to occur in the joint body. Whereas when the inclined surface extending from the rear end 12*c* at an angle of 0.1° to 10.0° with respect to the central axis A direction is formed in the inner peripheral surface of the first tubular body 12, it is considered that the ferrule 16 comes into point contact with the inclined surface of the first tubular body 12 at a plurality of points, or the ferrule 16 comes into surface contact with the inclined surface of the first tubular body 12 when the joint body is subjected to the bending stress. Therefore, in the joint body having such an inclined surface, the bending stress acting on the ferrule 16 from the first tubular body 12 is distributed to the plurality of portions of the ferrule 16 when the joint body is subjected to the bending stress. Consequently it is considered that the bending fracture strength is increased.

The above experimental results and consideration are also applicable to the case where the second tubular body 15 is provided with an inclined surface that extends from the front end 15*c* at a predetermined angle with respect to the central axis A direction. By providing the second tubular body 15 with the inclined surface extending from the rear end 15*c* at an angle of 0.1° to 10.0 with the central axis A direction, the concentration of the bending stress on the ferrule 16 from the second tubular body 15 can be eased and thereby it is considered that the bending fracture strength of the joint body can be improved.

Figure 5:
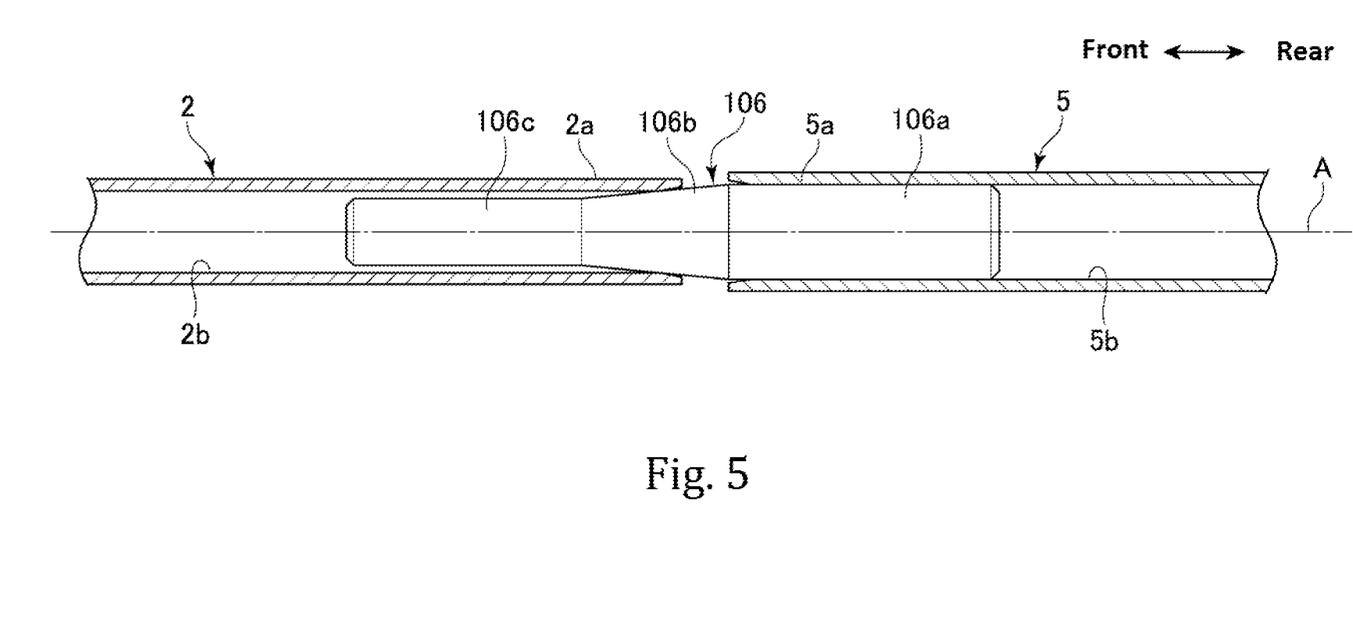
FIG. 5 schematically illustrates a joint structure of a spigot joint fishing rod according to another embodiment of the invention.

A joint structure of a spigot joint fishing rod according to another embodiment of the invention will be described with reference to FIG. 5. The joint structure shown in FIG. 5 is different from the joint structure shown in FIG. 2 in that the tip rod 2 and the butt rod 5 are jointed by a spigot ferrule 106 instead of the spigot ferrule 6.

The spigot ferrule 106 can be obtained, for example, by firing a prepreg sheet made of carbon fibers impregnated with a synthetic resin to form a tubular fired body, and polishing or coating the tubular fired body. The spigot ferrule 106 has a substantially cylindrical rear end portion 106*a*, an inclined portion 106*b* that is situated on the front side of the rear end portion 106*a* and has an outer peripheral surface inclined with respect to the central axis X, and a front end portion 106*c* that is provided on the front side of the inclined portion 106*b* and has a substantially cylindrical shape. The front end portion 106*c* is formed such that it has a smaller diameter than the rear end portion 106*a*. The spigot ferrule 106 is formed such that the length in the central axis direction is 50 to 150 mm, and an outer diameter of the rear end portion 106*a* is 3 to 15 mm. The angle formed by the outer peripheral surface of the inclined portion 106*b* and the central axis X is, for example, in the range of 0.05° to 5.0°. The inclination of the outer peripheral surface of the inclined portion 106*b* shown in FIG. 5 is exaggerated in order to clearly show the inclination. The spigot ferrule 106 may be hollow or solid. The dimensions of the spigot ferrule 106 described herein are exemplary. For example, the spigot ferrule 106 may be configured such that the outer peripheral surface inclines at a constant angle with respect to the central axis X from the rear end to the front end.

In one embodiment, the spigot ferrule 106 is inserted into the butt rod 5 to a predetermined position in the central axis A direction, and fixed to the inner peripheral surface 5*b* of the butt rod 5 by, for example, bonding. The spigot ferrule 106 is fixed to the butt rod 5 while a part thereof protrudes toward the front from the front end of the butt rod 5. The butt rod 5 contacts the spigot ferrule 106 at a position near its front end.

When the spigot ferrule 106 protruding from the front end 5*c* of the butt rod 5 is inserted into the tip rod 2 from the rear end of the tip rod, the spigot ferrule 106 is inserted to a predetermined joint position. In this way, the tip rod 2 and the butt rod 5 are jointed via the spigot ferrule 106.

In FIG. 5, the spigot ferrule 106 is inserted to the joint position. When the spigot ferrule 106 is seated at the joint position, there is a gap formed between the front end of the butt rod 5 and the rear end of the tip rod 2. The length of the gap in the central axis X direction is, for example, 3 to 10 mm. This is an example of the gap size. Since there is the gap between the tip rod 2 and the butt rod 5, bending stress and shear stress act on the spigot ferrule 106 when the tip rod 2 and the butt rod 5 are flexed during use of the fishing rod 1.

The spigot ferrule 106 may be bonded to the inner peripheral surface 2*b* of the joint portion 2*a* of the tip rod 2. In this case, the spigot ferrule 106 is fixed to the tip rod 2 such that the spigot ferrule 6 projects rearward from the rear end of the tip rod 2. By inserting the portion of the spigot ferrule 106 protruding from the rear end 2*c* of the tip rod 2 into the butt rod 5, the tip rod 2 and the butt rod 5 are connected via the spigot ferrule 106.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

LIST OF REFERENCE NUMBERS 1 fishing rod
2 tip rod
2b1 first inclined surface
5 butt rod
5b1 second inclined surface
6, 106 spigot ferrule

What is claimed is:

1. A fishing rod comprising:
a small-diameter hollow rod body extending in a central axis direction;
a large-diameter hollow rod body extending in the central axis direction; and
a spigot ferrule inserted in a rear end of the small-diameter rod body and into a front end of the large-diameter rod body to connect the small-diameter rod body and the large-diameter rod body,
wherein, on an inner peripheral surface of the small-diameter rod body, a first inclined surface that extends from the rear end of the small-diameter rod body at an angle of 0.1° to 3.0° with respect to the central axis direction is formed,
wherein the first inclined surface is spaced apart from the spigot ferrule.

2. The fishing rod of claim 1, wherein
the first inclined surface extends from the rear end of the small-diameter rod body to a first position in the central axis direction, and
the spigot ferrule is inserted further than the first position in the central axis direction.

3. The fishing rod of claim 1, wherein a length L1 from the rear end of the small-diameter rod body to a first position in the central axis direction satisfies L1≤10T1, where T1 is a thickness of the small-diameter rod body.

4. The fishing rod of claim 1, wherein, on an inner peripheral surface of the large-diameter rod body, a second inclined surface that extends from a front end of the large-diameter rod body at an angle of 1.0° to 3.0° with respect to the central axis direction is formed.

5. The fishing rod of claim 4, wherein
the second inclined surface extends from the front end of the large-diameter rod body to a second position in the central axis direction, and
the spigot ferrule is inserted further than the second position in the central axis direction.

6. The fishing rod of claim 4, wherein a length L2 from the front end of the large-diameter rod body to a second position in the central axis direction satisfies L2≤10T2, where T2 is a thickness of the large-diameter rod body.

7. The fishing rod of claim 1, wherein on an inner peripheral surface of the large-diameter rod body, a second inclined surface that extends from a front end of the large-diameter rod body at an angle of 1.0° to 2.0° with respect to the central axis direction is formed.

8. A fishing rod comprising:
a small-diameter hollow rod body extending in a central axis direction;
a large-diameter hollow rod body extending in the central axis direction; and
a spigot ferrule inserted in a rear end of the small-diameter rod body and into a front end of the large-diameter rod body to connect the small-diameter rod body and the large-diameter rod body,
wherein, on an inner peripheral surface of the small-diameter rod body, a first inclined surface that extends from the rear end of the small-diameter rod body at an angle of 0.1° to 2.0° with respect to the central axis direction is formed, wherein the first inclined surface is spaced apart from the spigot ferrule.

9. The fishing rod of claim 8, wherein
the first inclined surface extends from the rear end of the small-diameter rod body to a first position in the central axis direction, and
the spigot ferrule is inserted further than the first position in the central axis direction.

10. The fishing rod of claim 8, wherein a length L1 from the rear end of the small-diameter rod body to a first position in the central axis direction satisfies L1≤10T1, where T1 is a thickness of the small-diameter rod body.

11. The fishing rod of claim 8, wherein, on an inner peripheral surface of the large-diameter rod body, a second inclined surface that extends from the front end of the large-diameter rod body at an angle of 1.0° to 3.0° with respect to the central axis direction is formed.

12. The fishing rod of claim 11, wherein
the second inclined surface extends from the front end of the large-diameter rod body to a second position in the central axis direction, and
the spigot ferrule is inserted further than the second position in the central axis direction.

13. The fishing rod of claim 11, wherein a length L2 from the front end of the large-diameter rod body to a second position in the central axis direction satisfies L2≤10T2, where T2 is a thickness of the large-diameter rod body.

14. The fishing rod of claim 8, wherein on an inner peripheral surface of the large-diameter rod body, a second inclined surface that extends from the front end of the large-diameter rod body at an angle of 1.0° to 2.0° with respect to the central axis direction is formed.

* * * * *